(12) United States Patent
Tsai

(10) Patent No.: US 10,694,112 B2
(45) Date of Patent: Jun. 23, 2020

(54) VEHICULAR IMAGE PICKUP DEVICE AND IMAGE CAPTURING METHOD

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 46 days.

(21) Appl. No.: 16/034,056

(22) Filed: Jul. 12, 2018

(65) Prior Publication Data

US 2019/0208102 A1 Jul. 4, 2019

Related U.S. Application Data

(60) Provisional application No. 62/613,323, filed on Jan. 3, 2018.

(51) Int. Cl.
| | |
|---|---|
| *H04N 5/235* | (2006.01) |
| *B60R 11/04* | (2006.01) |
| *H04N 5/341* | (2011.01) |
| *H04N 5/225* | (2006.01) |
| *H04N 5/243* | (2006.01) |
| *G06T 7/00* | (2017.01) |
| *H04N 5/232* | (2006.01) |

(52) U.S. Cl.
CPC ........... *H04N 5/2353* (2013.01); *B60R 11/04* (2013.01); *G06T 7/97* (2017.01); *H04N 5/2256* (2013.01); *H04N 5/2352* (2013.01); *H04N 5/2354* (2013.01); *H04N 5/23229* (2013.01); *H04N 5/243* (2013.01); *H04N 5/341* (2013.01)

(58) Field of Classification Search
CPC ....... B60R 11/04; G06T 7/97; H04N 5/23229; H04N 5/2353; H04N 5/2354; H04N 5/341
See application file for complete search history.

(56) References Cited

U.S. PATENT DOCUMENTS

| | | | | |
|---|---|---|---|---|
| 6,549,239 B1* | 4/2003 | Tao | ....................... | H04N 5/2351 348/370 |
| 6,748,049 B1* | 6/2004 | Yamamoto | ........... | A61B 6/4441 378/98.7 |
| 9,466,001 B1* | 10/2016 | Ariga | ................. | G06K 9/00791 |

(Continued)

OTHER PUBLICATIONS

Kerr, APEX—The Additive System of Photographic Exposure' Issue 7, Aug. 2007 (Year 2007).

(Continued)

*Primary Examiner* — Amy R Hsu

(57) ABSTRACT

A vehicular image pickup device includes an image capturing unit, a fill light unit and a processing unit. The image capturing unit captures a driving image. The fill light unit provides a supplementary light of a fill light intensity. The processing unit retrieves an object image from the driving image and calculates, by conversion, a brightness distribution of a plurality of pixels on a straight line penetrating the object image. The processing unit fine-tunes a shutter speed of the image capturing unit, a gain of the image capturing unit or the fill light intensity of the fill light unit according to a waveform of the brightness distribution.

10 Claims, 9 Drawing Sheets

(56) References Cited

U.S. PATENT DOCUMENTS

| | | | | |
|---|---|---|---|---|
| 2007/0104475 | A1* | 5/2007 | Cheng | H04N 5/2351 |
| | | | | 396/234 |
| 2008/0266413 | A1* | 10/2008 | Cohen | G06T 5/003 |
| | | | | 348/222.1 |
| 2013/0182111 | A1 | 7/2013 | Ogasawara | |
| 2013/0278834 | A1* | 10/2013 | Ma | H04N 21/23614 |
| | | | | 348/730 |
| 2013/0332866 | A1 | 12/2013 | Johnson et al. | |
| 2014/0307924 | A1 | 10/2014 | Fillion et al. | |
| 2014/0354859 | A1 | 12/2014 | Noyes et al. | |
| 2018/0041681 | A1 | 2/2018 | Pope | |
| 2018/0068424 | A1* | 3/2018 | Kwon | G01S 7/493 |
| 2019/0202372 | A1 | 7/2019 | Tsai | |

OTHER PUBLICATIONS

U.S. Appl. No. 16/034,118, filed Jul. 12, 2018, USPTO.
U.S. Appl. No. 16/034,133, filed Jul. 12, 2018, USPTO.

* cited by examiner

VEHICULAR IMAGE PICKUP DEVICE AND IMAGE CAPTURING METHOD

BACKGROUND OF THE INVENTION

Field of the Invention

The present disclosure relates to image capturing technology and, more particularly, to a vehicular image pickup device and an image capturing method.

Description of the Prior Art

Image pickup devices are capable of recording images and thus have wide application, including ones installed at entrances and exits of buildings which require surveillance, to assist with tasks, such as conducting an investigation, preserving and collecting evidence.

Normally, conventional image pickup devices are each installed at a specific point to capture images within its image capturing radius according to an invariable operation model. However, if a conventional image pickup device is mounted on a moving object, for example, a vehicle, quality of images captured by the image pickup device deteriorates, depending of the speed of the moving object. Furthermore, accuracy of ensuing recognition of the captured images is affected.

SUMMARY OF THE INVENTION

In an embodiment, an image capturing method comprises the steps of: capturing a driving image by an image capturing unit; retrieving an object image from the driving image; calculating, by conversion, a brightness distribution of a plurality of pixels on a straight line penetrating the object image; and fine-tuning a shutter speed of the image capturing unit, a gain of the image capturing unit or a fill light intensity of a fill light unit according to a waveform of the brightness distribution.

In an embodiment, a vehicular image pickup device comprises an image capturing unit, a fill light unit, and a processing unit. The image capturing unit captures a driving image. The fill light unit provides a fill light of a fill light intensity. The processing unit retrieves an object image from the driving image, calculates, by conversion, a brightness distribution of a plurality of pixels on a straight line penetrating the object image, and fine-tunes a shutter speed of the image capturing unit, a gain of the image capturing unit or the fill light intensity of the fill light unit according to a waveform of the brightness distribution.

In conclusion, a vehicular image pickup device and an image capturing method in the embodiments of the present disclosure fine-tune a shutter speed, fill light intensity or gain according to a waveform of the brightness distribution of an object image in a driving image, so as to augment the detailed performance of the driving image. The vehicular image pickup device and the image capturing method in the embodiments of the present disclosure dispense with the need to wait for feedback from a back-end system and thus are capable of confirming the image quality of the driving image quickly and performing fine-tuning operation instantly. Therefore, the driving image of enhanced image quality can be quickly obtained.

Fine structures and advantages of the present disclosure are described below with reference to preferred embodiments of the present disclosure to enable persons skilled in the art to gain insight into the technical features of the present disclosure and implement the present disclosure accordingly. Persons skilled in the art can easily understand the objectives and advantages of the present disclosure by making reference to the disclosure contained in the specification, the claims, and the drawings.

DETAILED DESCRIPTION OF THE EMBODIMENTS

Figure 1:
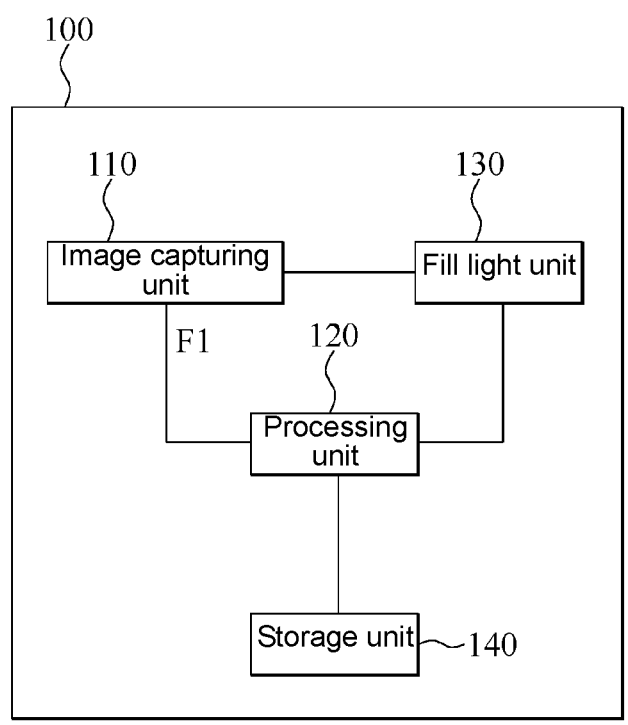
FIG. 1 is a block diagram of a vehicular image capturing device according to an embodiment of the present disclosure.

FIG. 1 is a block diagram of a vehicular image capturing device according to an embodiment of the present disclosure. Referring to FIG. 1, in general, a vehicular image pickup device 100 is mounted on a means of transport and adapted to capture and record a driving image F1. In some embodiments, the means of transport is a car or a motorcycle, but the present disclosure is not limited thereto. Any appropriate means of transport, which is suitable for use with the vehicular image pickup device 100, is applicable to the present disclosure.

In an embodiment, the vehicular image pickup device 100 comprises an image capturing unit 110 and a processing unit 120. The processing unit 120 is coupled to the image capturing unit 110. The vehicular image pickup device 100 further comprises a fill light unit 130. The fill light unit 130 is coupled to the image capturing unit 110 and the processing unit 120. The image capturing unit 110 captures the driving image F1. The fill light unit 130 outputs a fill light, i.e., a supplementary light, according to fill light intensity, so as to assist with the image-capturing function of the image capturing unit 110.

In some embodiments, the image capturing unit 110 comprises an assembly of lenses and light-sensing components. The light-sensing components include, for example, a complementary metal-oxide semiconductor (CMOS) and a charge-coupled device (CCD). The fill light unit 130 is, for example, implemented by a light-emitting diode (LED), an infrared LED (IR LED), a halogen lamp, or a laser source, but the present disclosure is not limited thereto.

The processing unit 120 controls and adjusts the operation of the image capturing unit 110 and/or the fill light unit 130 according to the image capturing method in any embodiment of the present disclosure to enhance the image quality of the driving image F1 captured by the image capturing unit 110.

In some embodiments, the processing unit 120 is, for example, a system-on-a-chip (SoC), a central processing unit (CPU), a microcontroller (MCU), or an application-specific integrated circuit (ASIC).

Figure 2:
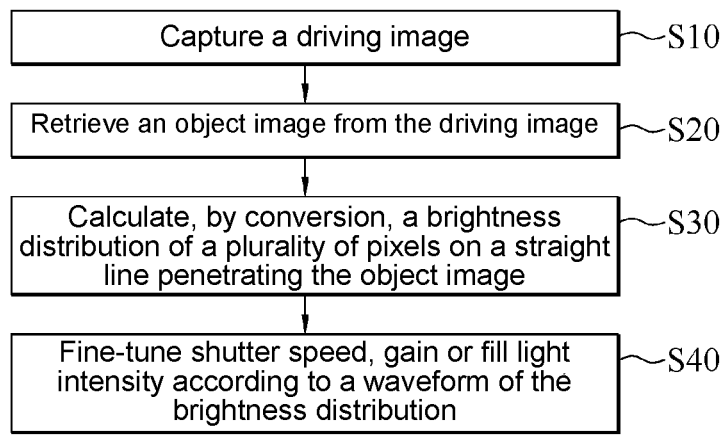
FIG. 2 is a schematic view of a process flow of an image capturing method according to an embodiment of the present disclosure.

FIG. 2 is a schematic view of a process flow of an image capturing method according to an embodiment of the present disclosure. Referring to FIG. 1 and FIG. 2, using an embodiment of the image capturing method, the processing unit 120 instructs the image capturing unit 110 to capture the driving image F1 (step S10). The processing unit 120 retrieves an object image M1 from the driving image F1 (step S20) and then calculates, by conversion, a brightness distribution of a plurality of pixels on a straight line L1 penetrating the object image M1 (step S30). Afterward, the processing unit 120 fine-tunes the shutter speed of the image capturing unit 110, the gain of the image capturing unit 110 or the fill light intensity of the fill light unit 130 according to a waveform of the brightness distribution (step S40), so as to optimize the image quality of the images captured by the vehicular image pickup device 100.

In an embodiment of step S10, the image capturing unit 110 captures the driving image F1 with a global shutter, but the present disclosure is not limited thereto. In a variant embodiment of step S10, the image capturing unit 110 captures the driving image F1 with a rolling shutter. Furthermore, the image capturing unit 110 captures the driving image F1 in the presence of the fill light, i.e., the supplementary light, of the fill light unit 130 at a predetermined shutter speed. In some embodiments, the predetermined shutter speed ranges from 1/1000 per second to 1/100000 per second.

In some embodiments, the driving image F1 comprises a plurality of pixels each displaying a corresponding grayscale according to one of the grayscale levels. Therefore, the look of the driving image F1 depends on the grayscales of the pixels and their locations.

In some embodiments, the driving image F1 consists of 1280*720 pixels, but the present disclosure is not limited thereto. In a variant embodiment, the driving image F1 consists of 360*240 pixels, 1920*1080 pixels, or any display standard-complying number of pixels.

In some embodiments, the grayscale levels are in the number of 256, for example, from grayscale level 0 to grayscale level 255, with grayscale level 0 having the least brightness, and grayscale level 255 having the greatest brightness, but the present disclosure is not limited thereto. In practice, the number of the grayscale levels depends on the performance of the image capturing unit 110. For instance, the image capturing unit 110 comprises an analog-to-digital conversion circuit. If the analog-to-digital conversion circuit operates on a 10-bit basis, the image capturing unit 110 provides performance of 1024 (i.e., $2^{10}$) grayscale levels. The other cases are inferred by analogy.

Figure 3:
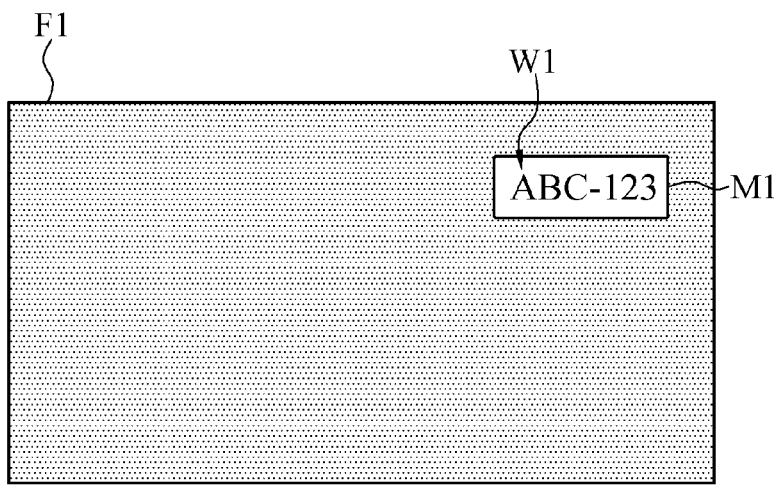
FIG. 3 is a schematic view of a driving image according to an embodiment of the present disclosure.

FIG. 3 is a schematic view of a driving image according to an embodiment of the present disclosure. Referring to FIG. 1 through FIG. 3, in some embodiments, if an object is within an image capturing radius of the vehicular image capturing device 100, the driving image F1 captured by the image capturing unit 110 includes the object image M1. If the object bears any character, a character image W1 is present on the object image M1 in the driving image F1 captured by the image capturing unit 110.

In an embodiment of step S20, the processing unit 120 retrieves the object image M1 from the driving image F1 by image processing technology, for example, image division.

Figure 4:
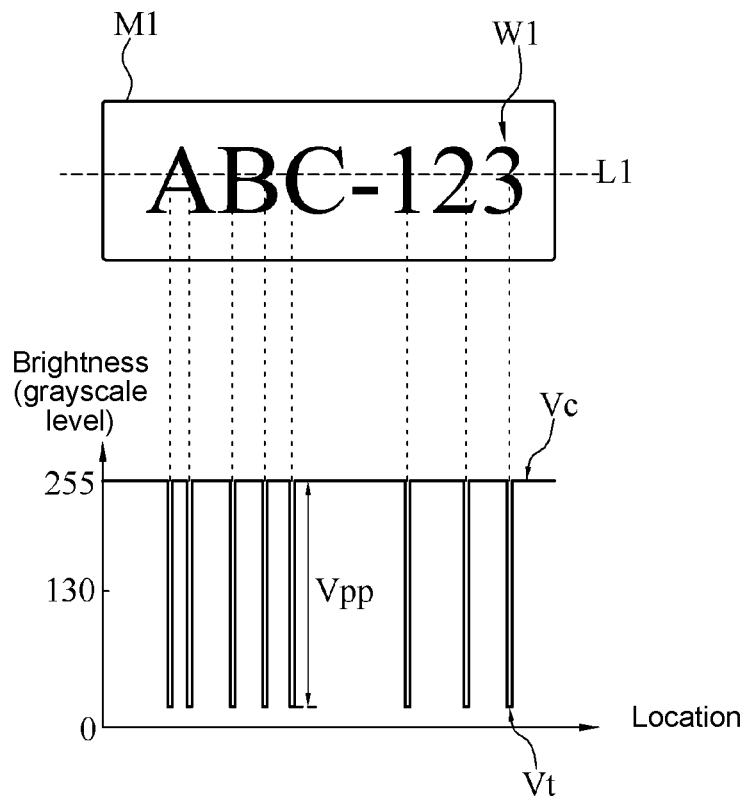
FIG. 4 is a schematic view of an object image and its brightness distribution according to an embodiment of the present disclosure.

FIG. 4 is a schematic view of an object image and its brightness distribution according to an embodiment of the present disclosure. Referring to FIG. 1 through FIG. 4, in an embodiment of step S30, the processing unit 120 defines a straight line L1 penetrating the object image M1 and thus calculates, by conversion, a brightness distribution of brightness against location, according to all the pixels on the straight line L1 and their locations. In some embodiments, the processing unit 120 defines the straight line L1 along the transverse axis of the object image M1 as shown in FIG. 4, but present disclosure is not limited thereto. In a variant embodiment, the straight line L1 penetrating the object image M1 runs along the vertical axis of the object image M1 or in any other appropriate direction. In this regard, the object image M1 comprises a plurality of character images W1, and the straight line L1 penetrates the character images W1.

Figure 5:
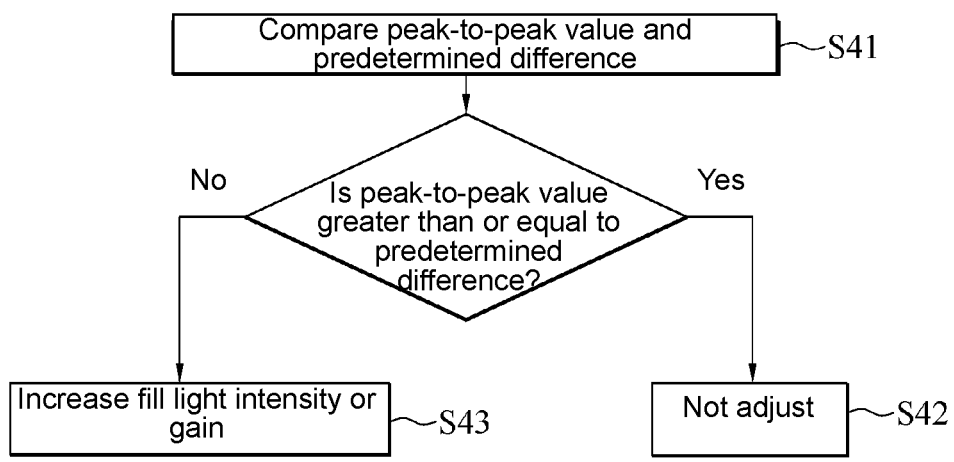
FIG. 5 is a schematic view of a process flow of step S40 in FIG. 2 according to an embodiment of the present disclosure.

FIG. 5 is a schematic view of a process flow of step S40 in FIG. 2 according to an embodiment of the present disclosure. Referring to FIG. 1 through FIG. 5, in an embodiment of step S40, the processing unit 120 performs the fine-tuning step according to a peak-to-peak value Vpp of the waveform of the brightness distribution calculated in step S30. The peak-to-peak value Vpp equals the difference between crest Vc and trough Vt of the waveform in the brightness distribution. Therefore, the processing unit 120 compares the peak-to-peak value Vpp of the waveform and a predetermined difference (step S41). If the peak-to-peak value Vpp is greater than or equal to the predetermined difference, the processing unit 120 determines that the contrast of the object image M1 is sufficient and thus does not adjust the gain of the image capturing unit 110, the fill light intensity of the fill light unit 130, and the shutter speed of the image capturing unit 110 (step S42). If the peak-to-peak value Vpp is less than the predetermined difference, the processing unit 120 determines that contrast of the object image M1 is insufficient and enables the fill light unit 130 to increase its fill light intensity or enables the image capturing unit 110 to increase its gain (step S43), so as to increase the contrast of the object image M1 in the driving image F1 captured after the fine-tuning step.

In some embodiments, the unit of measurement of the brightness in the brightness distribution is a grayscale level. The predetermined difference ranges from 90 grayscale levels to 110 grayscale levels. For instance, the predetermined difference is 100 grayscale levels, but the present disclosure is not limited thereto.

Figure 6:
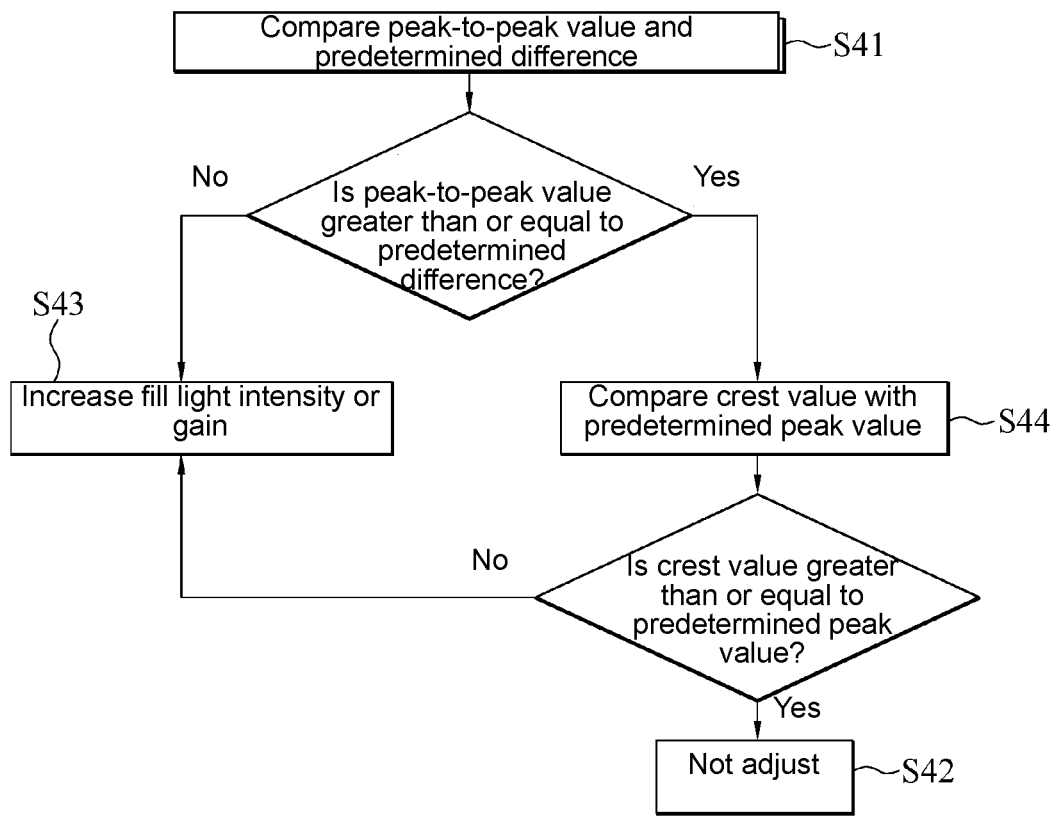
FIG. 6 is a schematic view of a process flow of step S40 in FIG. 2 according to an embodiment of the present disclosure.
Figure 7:
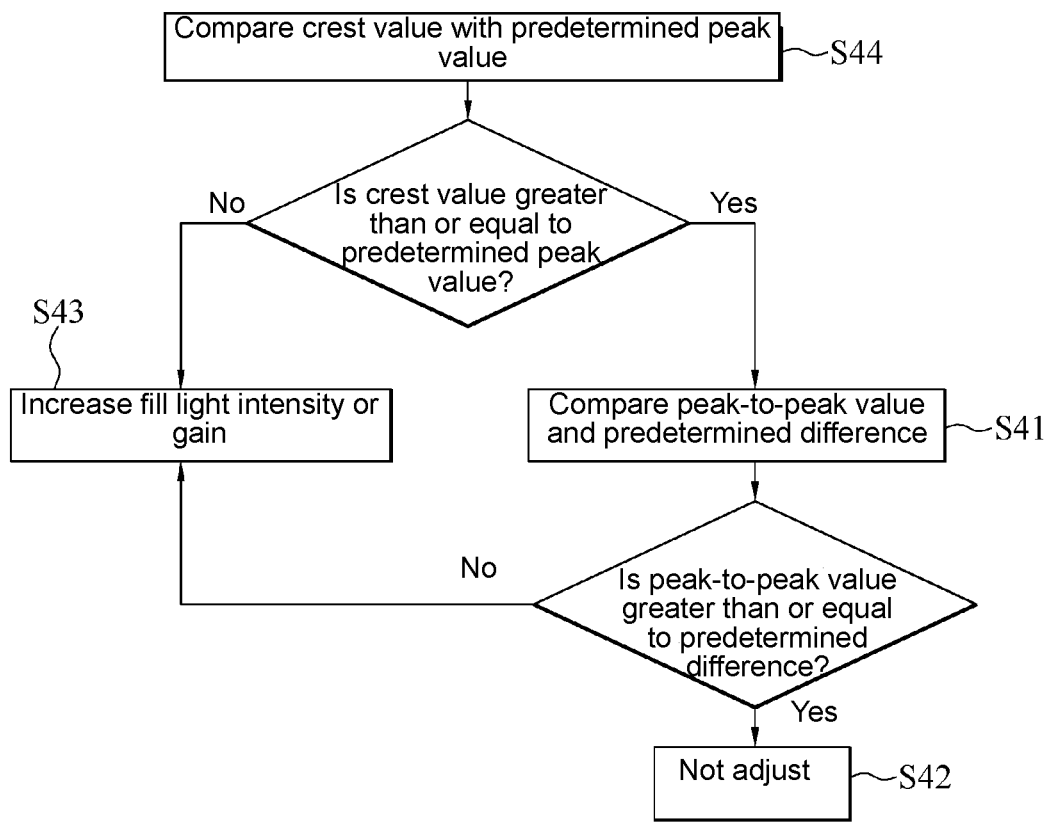
FIG. 7 is a schematic view of a process flow of step S40 in FIG. 2 according to an embodiment of the present disclosure.

FIG. 6 is a schematic view of a process flow of step S40 in FIG. 2 according to an embodiment of the present disclosure. Referring to FIG. 1 through FIG. 6, in an embodiment of step S40, in addition to the peak-to-peak value Vpp, the processing unit 120 performs fine-tuning operation according to the crest value. In an embodiment, after performing step S41 and determining that the peak-to-peak value Vpp is greater than or equal to the predetermined difference, the processing unit 120 compares the crest value of the waveform with a predetermined peak value (step S44). If the comparison carried out in step S44 shows that the crest value is greater than or equal to the predetermined peak value, it means that the object image M1 does not have overly low brightness (i.e., is not too dim), and thus the processing unit 120 proceeds to perform step S42, that is, the processing unit 120 does not perform adjustment. Conversely, if the comparison carried out in step S44 shows that the crest value is less than the predetermined peak value, it means that the object image M1 is likely to have overly low brightness (i.e., is likely to be too dim), and thus the processing unit 120 performs step S43 in order to increase the brightness of the object image M1, but the present disclosure is not limited thereto. FIG. 7 is a schematic view of a process flow of step S40 in FIG. 2 according to an embodiment of the present disclosure. Referring to FIG. 7, in another embodiment, the processing unit 120 performs step S44 before step S41. Afterward, if the comparison carried out in step S44 shows that the crest value is greater than or equal to the predetermined peak value, the processing unit 120 proceeds to perform step S41 which entails comparing the peak-to-peak value Vpp and the predetermined difference. Then, the processing unit 120 proceeds to perform step S42 or step S43 according to the comparison result of step S41. If the comparison carried out in step S44 shows that the crest value is less than the predetermined peak value, the processing unit 120 proceeds to perform step S43.

Figure 8:
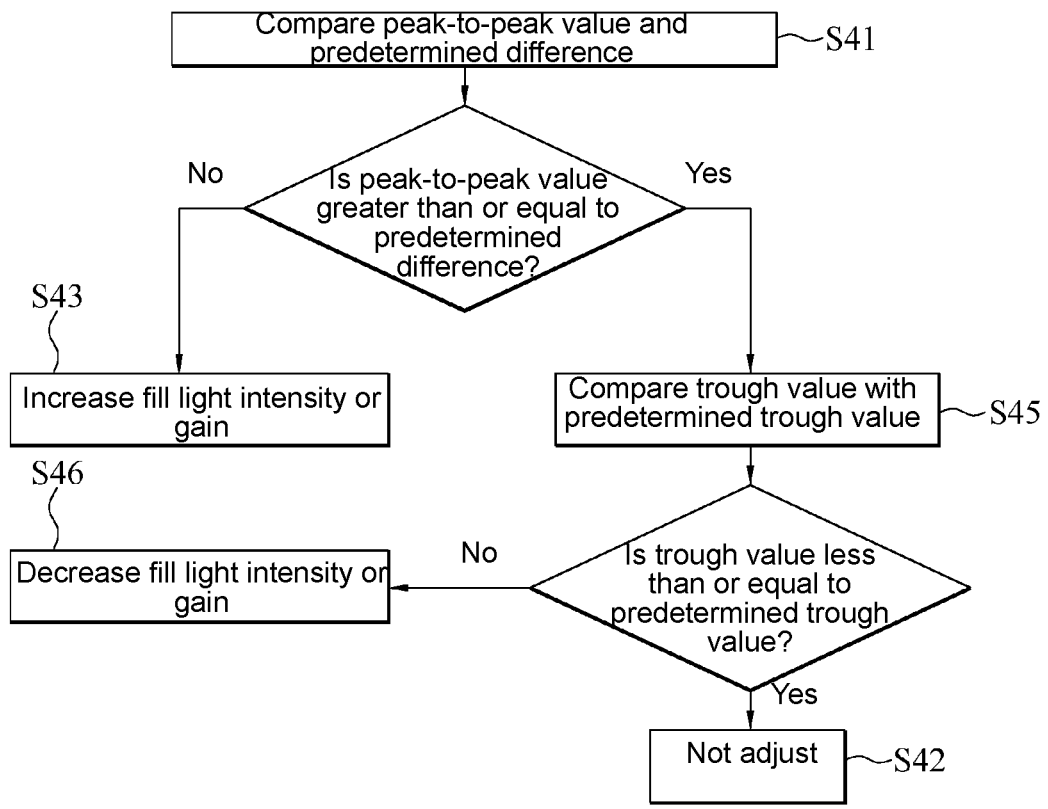
FIG. 8 is a schematic view of a process flow of step S40 in FIG. 2 according to an embodiment of the present disclosure.
Figure 9:
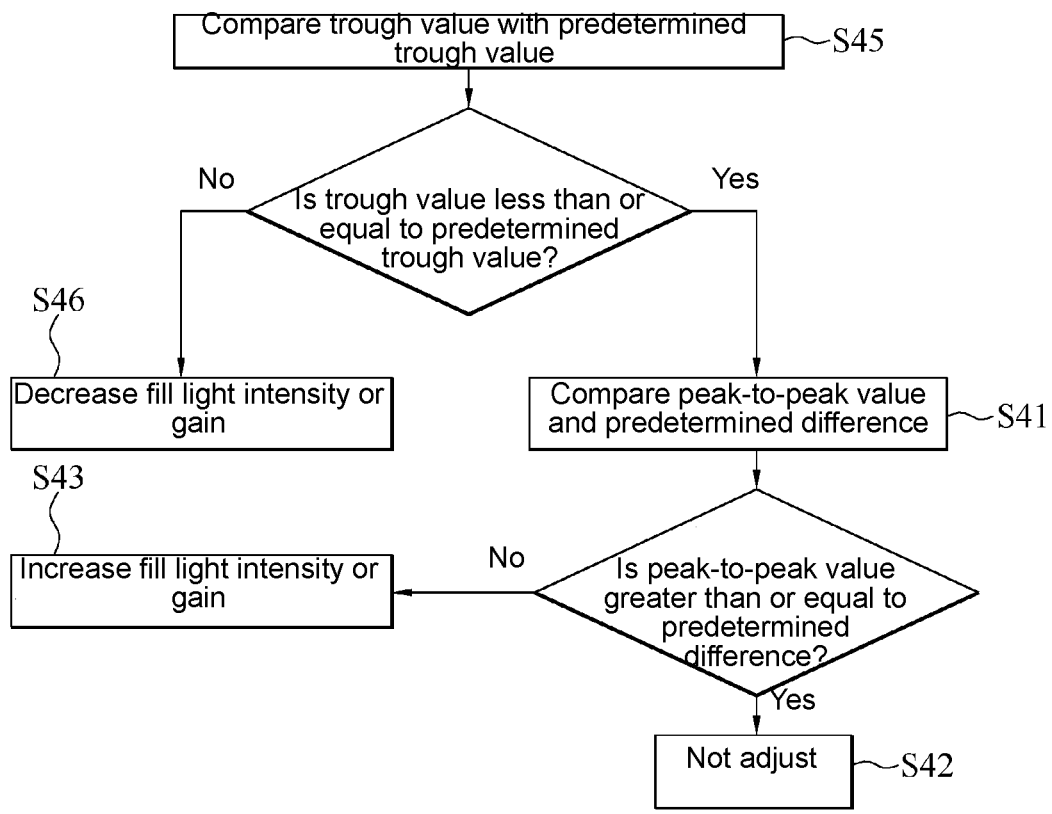
FIG. 9 is a schematic view of a process flow of step S40 in FIG. 2 according to an embodiment of the present disclosure.

FIG. 8 is a schematic view of a process flow of step S40 in FIG. 2 according to an embodiment of the present disclosure. Referring to FIG. 8, in an embodiment of step S40, in addition to the peak-to-peak value Vpp, the processing unit 120 performs fine-tuning operation according to the trough value. In an embodiment, after performing step S41 and determining that the peak-to-peak value Vpp is greater than or equal to the predetermined difference, the processing unit 120 compares the trough value of the waveform with a predetermined trough value (step S45). If the comparison carried out in step S45 shows that the trough value is less than or equal to the predetermined trough value, it means that the object image M1 does not have overly high brightness (i.e., is not too bright), the processing unit 120 proceeds to perform step S42 (i.e., does not perform adjustment). Conversely, if the comparison carried out in step S45 shows that the trough value is greater than the predetermined trough value, it means: the object image M1 is likely to have overly high brightness (i.e., is likely to be too bright); the processing unit 120 enables the fill light unit 130 to decrease its fill light intensity or enables the image capturing unit 110 to decrease its gain (step S46), but the present disclosure is not limited thereto. FIG. 9 is a schematic view of a process flow of step S40 in FIG. 2 according to an embodiment of the present disclosure. Referring to FIG. 9, in another embodiment, the processing unit 120 performs step S45 before step S41. Afterward, if the comparison carried out in step S45 shows that the trough value is less than or equal to the predetermined trough value, the processing unit 120 proceeds to perform step S41 which entails comparing the peak-to-peak value Vpp and the predetermined difference. Then, the processing unit 120 proceeds to perform step S42 or step S43 according to the comparison result of step S41. If the comparison carried out in step S45 shows that the trough value is greater than the predetermined trough value, the processing unit 120 proceeds to perform step S46.

In some embodiments, the predetermined peak value ranges from grayscale level 120 to grayscale level 140. The predetermined trough value ranges from grayscale level 120 to grayscale level 140. In some embodiments, the predetermined peak value equals the predetermined trough value.

For example, both the predetermined peak value and the predetermined trough value are grayscale level 130, but the present disclosure is not limited thereto.

Figure 10:
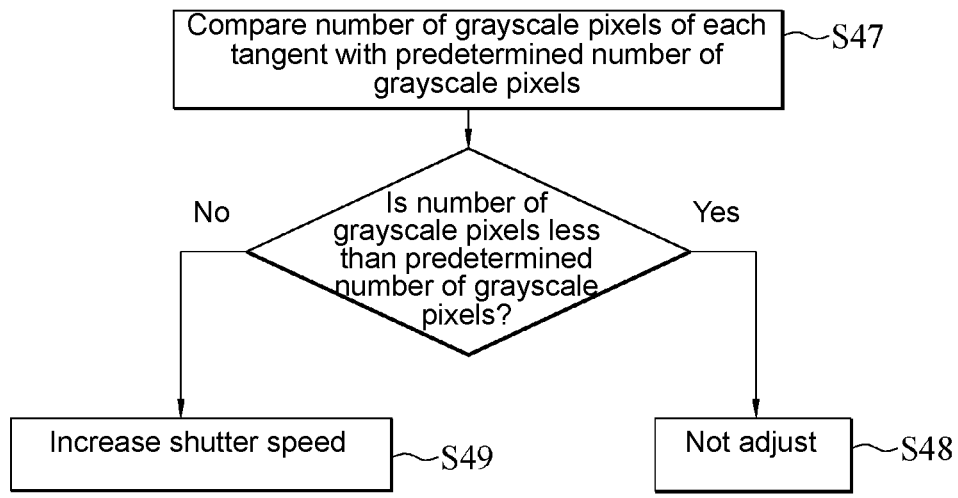
FIG. 10 is a schematic view of a process flow of step S40 in FIG. 2 according to an embodiment of the present disclosure.
Figure 11:
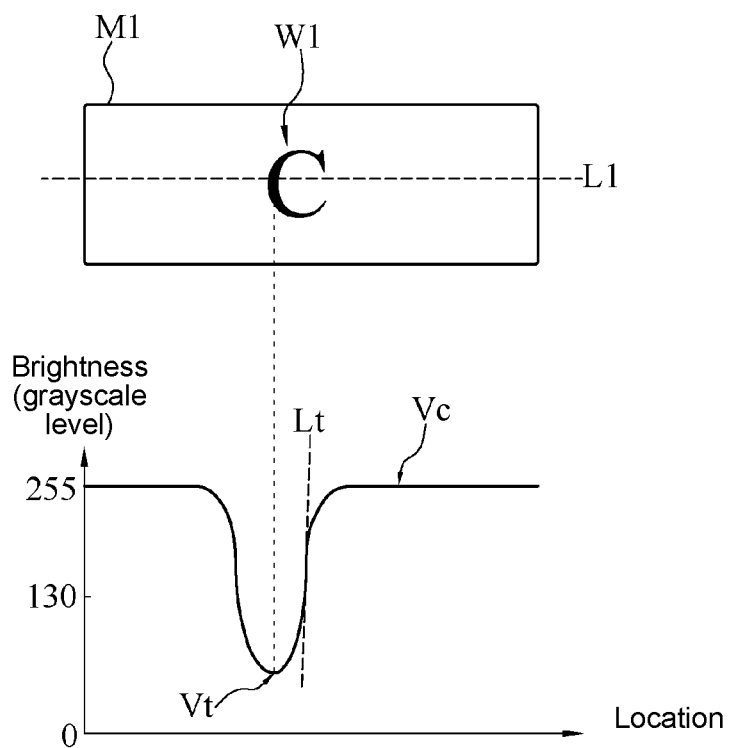
FIG. 11 is a schematic view of an object image and its brightness distribution according to an embodiment of the present disclosure.
Figure 12:
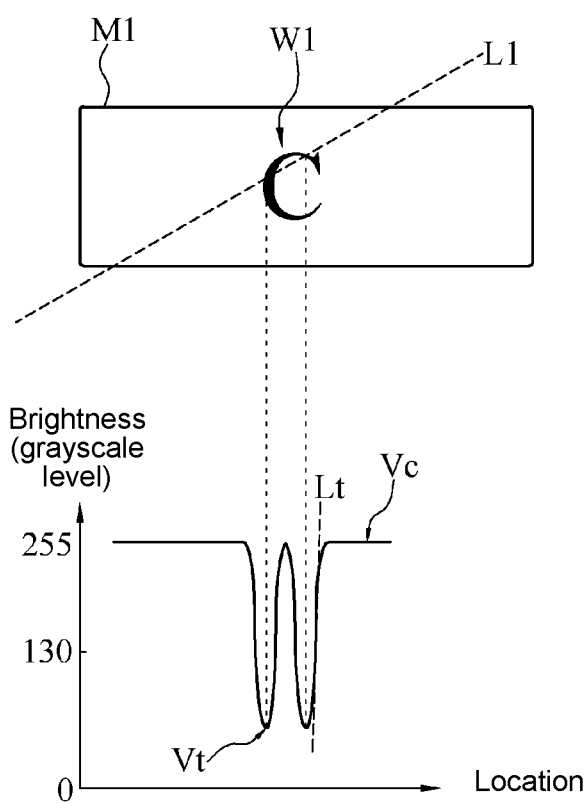
FIG. 12 is a schematic view of an object image and its brightness distribution according to an embodiment of the present disclosure.

FIG. 10 is a schematic view of a process flow of step S40 in FIG. 2 according to an embodiment of the present disclosure. FIG. 11 is a schematic view of an object image and its brightness distribution according to an embodiment of the present disclosure. FIG. 12 is a schematic view of an object image and its brightness distribution according to an embodiment of the present disclosure. Referring to FIG. 2, FIG. 10 through FIG. 12, in an embodiment of step S40, the processing unit 120 performs the fine-tuning step according to the number of grayscale pixels of each tangent Lt of the waveform of the brightness distribution calculated in step S30. The number of grayscale pixels of each tangent Lt equals the transition slope in transiting from crest Vc to trough Vt or the transition slope in transiting from trough Vt to crest Vc. In some embodiments, the unit of measurement of the brightness in the brightness distribution is a grayscale level, and thus the unit of measurement of the number of grayscale pixels of the tangent is: grayscale level/number of pixels.

The processing unit 120 compares the number of grayscale pixels of each tangent with a predetermined number of grayscale pixels (step S47). If the number of grayscale pixels of each tangent is less than the predetermined number of grayscale pixels, it means: sharpness of the object image M1 is sufficient; and the processing unit 120 does not adjust the gain of the image capturing unit 110, the fill light intensity of the fill light unit 130, and the shutter speed of the image capturing unit 110 (step S48). If the number of grayscale pixels of any tangent is greater less than the predetermined number of grayscale pixels, it means: sharpness of the object image M1 is insufficient; and the processing unit 120 enables the image capturing unit 110 to increase its shutter speed (step S49), so as to increase the sharpness of the object image M1 in the driving image F1 captured after the fine-tuning step.

In some embodiments, the predetermined number of grayscale pixels falls within a specific numeric range, say, 0 to 2 (grayscale level/number of pixels), but the present disclosure is not limited thereto.

In some embodiments, the processing unit 120 performs step S10 through step S40 repeatedly to effectuate fine-tuning repeatedly such that the driving image F1 captured by the image capturing unit 110 is capable of sufficient detailed performance. Since the image quality of the driving image F1 is confirmed by the processing unit 120 according to the waveform of the brightness distribution of the object image M1 in the driving image F1, feedback is quick enough to allow the processing unit 120 to effectuate fine-tuning accordingly. Therefore, the driving image F1 of enhanced image quality can be quickly obtained.

In some embodiments, before performing step S20, the processing unit 120 sets the shutter speed of the image capturing unit 110 on a preliminary basis such that the driving image F1 captured by the image capturing unit 110 does not blur. Before performing step S20, the processing unit 120 adjusts the fill light intensity of the fill light unit 130 or the gain of the image capturing unit 110 on a preliminary basis such that the driving image F1 captured by the image capturing unit 110 has appropriate brightness. Furthermore, given the appropriately set shutter speed, fill light intensity or gain, the processing unit 120 performs the fine-tuning operation of step S10 through step S40 of the image capturing method to further augment the detailed performance of the driving image F1.

In some embodiments, the product of the shutter speed of the image capturing unit 110, the gain of the image capturing unit 110, and the fill light intensity of the fill light unit 130 before the fine-tuning equals the product of the shutter speed of the image capturing unit 110, the gain of the image capturing unit 110, and the fill light intensity of the fill light unit 130 after the fine-tuning in step S40. For instance, if the processing unit 120 enables the shutter speed to reduce to a half thereof, the processing unit 120 enables the gain or fill light intensity to double; hence, the product of the shutter speed, gain and fill light intensity is substantially the same before and after the fine-tuning operation; in other words, the fine-tuning operation brings no great change in the product of the shutter speed, gain and fill light intensity.

In some embodiments, the vehicular image pickup device 100 further comprises a storage unit 140. The storage unit 140 is coupled to the processing unit 120. The storage unit 140 stores parameters for use in the image capturing method in any embodiment of the present disclosure, for example, a predetermined difference, a predetermined peak value, a predetermined trough value, a predetermined number of grayscale pixels, a shutter speed, a fill light intensity, and/or a gain.

In some embodiments, the vehicular image pickup device 100 is for use in a detection system of the police forces. For instance, the vehicular image pickup device 100 is mounted on a police car. The vehicular image pickup device 100 is electrically connected to an internal system of the police car, and the internal system sends the captured driving image F1 to a back-end system. The back-end system performs post-processing and image recognition on the driving image F1, and thus assists the police in quickly recording and recognizing license plates and car models. The object image M1 in the driving image F1 is an image of a license plate or an image of the car body. The character images W1 are images of numerals or characters.

In conclusion, a vehicular image pickup device and an image capturing method in the embodiments of the present disclosure fine-tune a shutter speed, fill light intensity or gain according to a waveform of the brightness distribution of an object image in a driving image, so as to augment the detailed performance of the driving image. The vehicular image pickup device and the image capturing method in the embodiments of the present disclosure dispense with the need to wait for feedback from a back-end system and thus are capable of confirming the image quality of the driving image quickly and performing fine-tuning operation instantly. Therefore, the driving image of enhanced image quality can be quickly obtained.

Although the present disclosure is disclosed above by preferred embodiments, the preferred embodiments are not restrictive of the present disclosure. Changes and modifications made by persons skilled in the art to the preferred embodiments without departing from the spirit of the present disclosure must be deemed falling within the scope of the present disclosure. Accordingly, the legal protection for the present disclosure should be defined by the appended claims.

What is claimed is:

1. An image capturing method, comprising the steps of:
    capturing a driving image by an image capturing unit;
    retrieving an object image from the driving image;
    calculating, by conversion, a brightness distribution of a plurality of pixels on a straight line penetrating the object image; and
    fine-tuning a shutter speed of the image capturing unit, a gain of the image capturing unit or a fill light intensity of a fill light unit according to a waveform of the brightness distribution, wherein the fine-tuning step comprises:
        comparing a peak-to-peak value of the waveform with a predetermined difference;
        not adjusting the shutter speed, the gain and the fill light intensity if the peak-to-peak value is greater than or equal to the predetermined difference; and
        increasing the fill light intensity or the gain if the peak-to-peak value is less than the predetermined difference;
        wherein the peak-to-peak value equals a difference between a crest value and a trough value of the waveform in the brightness distribution.

2. The image capturing method of claim 1, wherein the fine-tuning step further comprises:
    comparing the crest value of the waveform with a predetermined peak value;
    not adjusting the shutter speed, the gain and the fill light intensity if the crest value is greater than or equal to the predetermined peak value; and
    increasing the fill light intensity or the gain if the crest value is less than the predetermined peak value.

3. The image capturing method of claim 1, wherein the fine-tuning step further comprises:
    comparing the trough value of the waveform with a predetermined trough value;
    decreasing the fill light intensity or the gain if the trough value is greater than the predetermined trough value; and
    not adjusting the shutter speed, the gain and the fill light intensity if the trough value is less than or equal to the predetermined trough value.

4. The image capturing method of claim 1, wherein the fine-tuning step comprises:
    not adjusting the shutter speed, the gain and the fill light intensity if the number of grayscale pixels of each tangent of the waveform is less than a predetermined number of grayscale pixels; and
    increasing the shutter speed if the number of grayscale pixels of any said tangent of the waveform is greater than the predetermined number of grayscale pixels.

5. The image capturing method of claim 1, wherein a product of the shutter speed, the gain and the fill light intensity before the fine-tuning equals a product of the shutter speed, the gain and the fill light intensity after the fine-tuning.

6. A vehicular image pickup device, comprising:
    an image capturing unit for capturing a driving image;
    a fill light unit for providing a fill light of a fill light intensity; and
    a processing unit for retrieving an object image from the driving image, calculating, by conversion, a brightness distribution of a plurality of pixels on a straight line penetrating the object image, and fine-tuning a shutter speed of the image capturing unit, a gain of the image capturing unit or the fill light intensity according to a waveform of the brightness distribution, wherein the fine-tuning step comprises:
        comparing a peak-to-peak value of the waveform with a predetermined difference; not adjusting the shutter speed, the gain and the fill light intensity if the peak-to-peak value is greater than or equal to the predetermined difference; and
        increasing the fill light intensity or the gain if the peak-to-peak value is less than the predetermined difference;

wherein the peak-to-peak value equals a difference between a crest value and a trough value of the waveform in the brightness distribution.

7. The vehicular image pickup device of claim 6, wherein the fine-tuning step further comprises: comparing the crest value of the waveform with a predetermined peak value; not adjusting the shutter speed, the gain and the fill light intensity if the crest value is greater than or equal to the predetermined peak value; and increasing the fill light intensity or the gain if the crest value is less than the predetermined peak value.

8. The vehicular image pickup device of claim 6, wherein the fine-tuning step further comprises: comparing the trough value of the waveform with a predetermined trough value; decreasing the fill light intensity or the gain if the trough value is greater than the predetermined trough value; and not adjusting the shutter speed, the gain and the fill light intensity if the trough value is less than or equal to the predetermined trough value.

9. The vehicular image pickup device of claim 6, wherein the processing unit does not adjust the shutter speed, the gain and the fill light intensity if the number of grayscale pixels of each tangent of the waveform is less than a predetermined number of grayscale pixels, but the processing unit increases the shutter speed if the number of grayscale pixels of any said tangent of the waveform is greater than the predetermined number of grayscale pixels.

10. The vehicular image pickup device of claim 6, wherein a product of the shutter speed, the gain and the fill light intensity before the fine-tuning equals a product of the shutter speed, the gain and the fill light intensity after the fine-tuning.

* * * * *